(12) United States Patent
Manten et al.

(10) Patent No.: US 12,076,938 B2
(45) Date of Patent: Sep. 3, 2024

(54) THERMOPLASTIC COMPOSITE PRODUCT

(71) Applicant: Dutch Thermoplastic Components B.V., Almere (NL)

(72) Inventors: David Reijer Manten, Eemnes (NL); Jeffrey Rogier Vroemen, Nunspeet (NL); Dennis Lunenborg, Utrecht (NL); Peter Floris Evert Boer, Renkum (NL)

(73) Assignee: DUTCH THERMOPLASTIC COMPONENTS B.V., Almere (NL)

( * ) Notice: Subject to any disclaimer, the term of this patent is extended or adjusted under 35 U.S.C. 154(b) by 0 days.

(21) Appl. No.: 18/143,218

(22) Filed: May 4, 2023

(65) Prior Publication Data

US 2023/0271388 A1    Aug. 31, 2023

Related U.S. Application Data

(63) Continuation of application No. 16/926,854, filed on Jul. 13, 2020, now Pat. No. 11,654,639.

(30) Foreign Application Priority Data

Jul. 11, 2019 (NL) ...................................... 2023482

(51) Int. Cl.
*B29C 65/00* (2006.01)
*B29C 65/18* (2006.01)
*B29C 70/30* (2006.01)

(52) U.S. Cl.
CPC ........ *B29C 66/12842* (2013.01); *B29C 65/18* (2013.01); *B29C 66/12822* (2013.01); *B29C 66/72141* (2013.01); *B29C 66/723* (2013.01); *B29C 70/304* (2021.05); *B29C 66/128* (2013.01); *B29C 66/12841* (2013.01); *B29K 2995/0051* (2013.01)

(58) Field of Classification Search
CPC ................ B29C 66/723; B29C 66/128; B29C 66/12841; B29C 66/72141
See application file for complete search history.

(56) References Cited

U.S. PATENT DOCUMENTS

2018/0345591 A1* 12/2018 Cominsky ........... B29C 66/1162
2019/0136833 A1*  5/2019 Broome ................. B29C 65/10

* cited by examiner

*Primary Examiner* — Philip C Tucker
*Assistant Examiner* — Nickolas R Harm
(74) *Attorney, Agent, or Firm* — KDW Firm PLLC

(57) ABSTRACT

A method for manufacturing a thermoplastic composite product includes: providing a first and second thermoplastic composite component made from a consolidated stack of thermoplastic composite plies, said first and second component having a first and second ply drop off, respectively. The first and second components are positioned such that the first ply drop off and the second ply drop off are aligned, and the first and second components are fixedly connected by means of heating. The stacks of plies for the first and second components are constructed by stacking the plies in a stacking direction wherein the plies are arranged such that plies at a different position along the stacking direction are laterally offset relative to each other for the purpose of forming the first ply drop off and the second ply drop off, respectively, before consolidating.

19 Claims, 8 Drawing Sheets

THERMOPLASTIC COMPOSITE PRODUCT

CROSS-REFERENCE TO RELATED APPLICATIONS

This application is a continuation of U.S. nonprovisional patent application Ser. No. 16/926,854, filed Jul. 13, 2020, which claims priority to Netherlands patent application serial number NL2023482, filed Jul. 11, 2019, the entirety of which application is incorporated by reference herein.

FIELD OF THE DISCLOSURE

The present invention relates to a method for manufacturing a thermoplastic composite product. The present invention further relates to a method for connecting a first thermoplastic composite component having a first connecting region and being made from a consolidated stack of thermoplastic composite plies to a second thermoplastic composite component having a second connecting region and being made from a consolidated stack of thermoplastic composite plies. In addition, the present invention relates to a thermoplastic composite product and to a structural component of an aircraft comprising the same.

BACKGROUND

Thermoplastic composites consist of a thermoplastic matrix combined with a reinforcing material typically in the form of fibers, such as carbon fibers. Most of the thermoplastic composites comprise multiple layers, wherein each layer comprises fibers that are encapsulated, surrounded, and/or supported by a relatively thin layer of thermoplastic material. Hereinafter, such layer will be referred to as a ply. Generally, there exists a single orientation of the fibers within a single ply.

To form a thermoplastic composite, multiple plies are arranged on top of each other, wherein the orientation of the fibers changes in the layer stack. For example, a ply stack may comprise a plurality of plies wherein the orientation of the fibers of adjacent plies is orthogonal to each other.

After having arranged the plies into a ply stack, the stack is subjected to a consolidation process in which the thermoplastic material of the ply stack is brought to a temperature above the melting point of the thermoplastic material. Typically, pressure is simultaneously exerted onto the ply stack. Due to the melting of the thermoplastic material, the fibers will be supported by a single substantially integral body of the thermoplastic material. Hereinafter, the process of applying heat to the ply stack for integrally connecting the plies, e.g. by melting the thermoplastic layers, will be referred to as consolidation. Moreover, to realize the consolidation, a so-called consolidation press is used. Such press typically comprises a pair of opposing molds in between which the ply stack is arranged. The molds are kept at a temperature above the melting temperature of the thermoplastic material. After having arranged the ply stack in between the molds, the molds are moved towards each other for exerting pressure on the ply stack while simultaneously heating the ply stack.

The maximum size of thermoplastic composites is determined by the size of the consolidation press. Moreover, as the molds generally have a flat surface, the complexity of the final shape is limited.

To address the abovementioned problems, it is known to construct larger, more complex thermoplastic composite products using a plurality of smaller, less complex thermoplastic composite components. For example, a method for manufacturing a thermoplastic composite product in accordance with the preamble of claim 1 is known from EP 3 108 993 A1. This known method comprises the steps of providing a first thermoplastic composite component made from a consolidated stack of thermoplastic composite plies, and providing a second thermoplastic composite component made from a consolidated stack of thermoplastic composite plies.

The first component has a first ply drop off and the second component has a second ply drop off, wherein a shape of the second ply drop off is complementary to a shape of the first ply drop off.

As a next step, the first and second components are positioned such that the first ply drop off and the second ply drop off are aligned. Thereafter, the first and second components are fixedly connected by heating of the first and second ply drop offs to a temperature that is higher than a melting temperature of the plies used for making the first and second components.

In the abovementioned known method, the first and second ply drop offs are realized by removing material of the first component and of the second component, respectively, by means of a laser beam in order to form a first and a second stepped structure, respectively, having a plurality of steps. It should be noted that such a stepped structure is but one example of a ply drop off. In general, a stack of plies extends along the aforementioned stacking direction and along one or more lateral directions. If there is a difference in how much each individual ply extends in a given lateral direction, a ply drop off will be formed at the edge that extends perpendicular to that lateral direction. Typically, the ply drop off will be continuous in the sense that when viewed along the stacking direction, a higher positioned ply will always extend in a particular direction at least as much as a lower positioned ply or at most as much as a lower positioned ply.

The Applicant has found that the structural integrity, e.g. strength, stiffness, etc., of the thermoplastic composite product of the type described above is often inferior to that of the components from which it is made. For example, the Applicant has found that the strength of the connection between the first and second components can be significantly less than what would be expected based on the properties of the first and second components.

SUMMARY OF THE DISCLOSURE

It is an object of the present invention to provide a method for manufacturing a thermoplastic composite product in which the abovementioned problems do not occur or to a lesser extent.

According to a first aspect of the invention, this object is achieved by the method as defined in claim 1 that is characterized in that said providing a first thermoplastic composite component and said providing a second thermoplastic composite component comprise stacking thermoplastic composite plies in a stacking direction for the purpose of forming the first ply drop off and the second ply drop off, respectively, wherein the plies in each ply stack are arranged such that plies at a different position along the stacking direction are laterally offset relative to each other, and consolidating the ply stack of the first component and consolidating the ply stack of the second component.

Hereinafter, it will be assumed that the layer build-up of the first and second thermoplastic composite components is at least similar but preferably identical. For example, the number of plies, the thickness thereof, the orientation variation in the stack of plies, the thermoplastic material(s) used in the plies, and the type of fiber used in the plies, are preferably identical. Moreover, a ply should be construed as referring to an at least substantially flat strip comprising fibers that extend in parallel to a surface of the ply and that are encapsulated by a thermoplastic material. Preferably, the fibers are aligned in a single direction although it may also be possible to have fibers aligned in a plurality of directions, for example two directions that are perpendicular to each other but parallel to the surface of the ply.

Each of the first and second components comprises a plurality of fiber layers that are kept together by the thermoplastic material. The Applicant has found that a cause for the abovementioned problem of reduced strength between the first and second components can be attributed to misalignment between the fiber layers of the first and second components. More in particular, opposing fiber layers in the first and second components do not sufficiently cooperate to transfer forces from one component to the other.

The Applicant has further found that a possible explanation for the misalignment could be related to the use of laser welding for realizing the stepped structure. More in particular, the Applicant found that is very difficult to control the depth of the recesses made in the first and second components for the purpose of realizing the stepped structure.

According to the invention, this problem is solved by realizing the ply drop off before consolidation. In this manner, the ply drop off is defined by the plies themselves instead of a mechanical or other operation performed after consolidation.

A further advantage of the invention is that, compared to the method described in CA2934197, the additional step of using a laser beam to generate the ply drop offs can be avoided. Such laser processing reduces the amount of thermoplastic material at the upper surface of the stepped structure. If no thermoplastic material is added prior to connecting the first and second components, such reduction may result in a degradation of the strength of the connection between the first and second component.

The first and/or second ply drop off may be formed by offsetting each ply in the stack of plies for the first or second component, respectively, relative to an adjacent ply. For the positioning of the plies, an automated setup is preferably used that is able to accurately position the plies either relative to an absolute reference point and/or relative to an already positioned ply.

The stack of plies for each of the first and second component may comprise adjacently arranged ply groups, each ply group comprising at least one ply, wherein the plies in a same ply group are not offset relative to each other, and wherein each ply group is offset relative to an adjacent ply group. In this manner, a stepped structure can be obtained in which each step comprises multiple plies.

At least one, but preferably each, ply group among the ply groups of the first and second components may comprise a plurality of plies. The offset between adjacent plies or between adjacent ply groups can be identical throughout the stack of plies. Additionally or alternatively, the offset between adjacent plies or between adjacent ply groups may exceed 5 mm, preferably 7 mm, and more preferably 10 mm.

The stacking of plies in the stacking direction for the purpose of realizing the stack of plies for the first component and the stack of plies for the second component may comprise locally fixating a ply to an already arranged ply, preferably by means of local application of heat such as ultrasonic welding and/or tack welding. By locally fixating a ply to an already arranged ply, the mutual position of the plies can be fixated. Such fixation is advantageous because after the stacking of the plies, the ply stack has to be transferred to a different position for further processing. For example, the stack of plies has to be moved from a stacking table to a consolidation press. During such transfer and subsequent consolidation process, the stack of plies may not move significantly.

The positioning of the first and second components such that the first ply drop off and the second ply drop off are aligned may comprise clamping or otherwise fixating the relative position of the first and second components at least during the heating of the first and second ply drop offs.

The first and second components may be fixedly connected by providing a first heated mold and a second heated mold, arranging the first and second components in between the first and second molds with the first and second ply drop offs being aligned, and bringing the first and second molds towards each other for the purpose of heating the first and second ply drop offs while simultaneously applying pressure to the first and second ply drop offs. The first and second molds are preferably heated to a temperature above the melting temperature(s) of the thermoplastic composite plies of the first and second components. The method may further comprise the steps of providing a third mold and a fourth mold, and arranging the first and second components in between the third and fourth molds with the first and second ply drop offs being aligned, after having been arranged in between the first and second molds. Subsequently, the third and fourth molds are brought towards each other for the purpose of cooling down the first and second ply drop offs while simultaneously applying pressure to the first and second ply drop offs. For example, the third and fourth molds can be heated to a temperature below the melting temperature(s) of the thermoplastic composite plies of the first and second components. By using a two-step thermal process with the simultaneous application of pressure, a more efficient use of energy can be obtained and the cycle time can be reduced. For example, instead of using the first and second molds to heat and cool the first and second components, e.g. by varying the temperatures of the first and second molds, the first, second, third, and fourth molds can be kept at a substantially constant temperature.

The abovementioned process may further comprise moving the first and second molds away from each other after having heated the first and second ply drop off, and displacing the first and second components relative to the first and second molds to a position in between the third and fourth molds.

The relative position of the first and second components preferably remains fixated during the displacing of the first and second components and during the application of pressure by the third and fourth molds. Additionally or alternatively, the third and fourth mold, when brought together, completely enclose the first and second ply drop offs, and wherein a part of the first component remote from the first ply drop off extends outside of the third and fourth molds, and wherein a part of the second component remote from the second ply drop off extends outside of the third and fourth molds.

The first and second molds, when brought together, may completely enclose the first and second ply drop offs. A part of the first component remote from the first ply drop off may extend outside of the first and second molds, and a part of the second component remote from the second ply drop off may extend outside of the first and second mold. Accordingly, the first and second molds need not completely surround the first and second components as these components have already been consolidated. The local heating is only required to establish the connection between these components. Additionally or alternatively, a temperature of the first mold and a temperature of the second mold may be controlled such that a local temperature of the first and/or second mold close to or at a region in which the first and second ply drop offs are aligned is higher than the melting temperature of the thermoplastic composite plies of the first and second components, and such that a local temperature of the first and/or second mold close to an end of that mold from which the remaining part of the first or second component extends is lower than said melting temperature. In this manner, only the region near the first and second ply drop offs is melted.

According to a second aspect, the present invention provides a method for connecting a first thermoplastic composite component having a first connecting region and being made from a consolidated stack of thermoplastic composite plies to a second thermoplastic composite component having a second connecting region and being made from a consolidated stack of thermoplastic composite plies. The method according to the second aspect of the invention is particularly well suited for connecting a first and second thermoplastic composite component that have been manufactured using the method described above. Therefore, features mentioned in connection with that method equally apply to the method according to the second aspect of the invention, and vice versa.

According to the second aspect of the invention, the method comprises the step of providing a first heated mold and a second heated mold, arranging the first and second components in between the first and second molds with the first and second connecting regions being aligned, and bringing the first and second molds towards each other for the purpose of said heating the first and second connecting regions while simultaneously applying pressure to the first and second connecting regions. In addition, the method comprises the step of allowing the first and second connecting regions to cool down while simultaneously applying pressure to the first and second connecting regions.

The first and second molds may be heated to a temperature above the melting temperature(s) of the thermoplastic composite plies of the first and second components. In this case, the method may further comprise providing a third mold and a fourth mold, arranging the first and second components in between the third and fourth molds with the first and second connecting regions being aligned, after having been arranged in between the first and second molds, and bringing the third and fourth molds towards each other for the purpose of said cooling down the first and second connecting regions while simultaneously applying pressure to the first and second connecting regions. Here, the third and fourth molds are preferably heated to a temperature below the melting temperature(s) of the thermoplastic composite plies of the first and second components. This two-stage process ensures efficient use of energy and time.

The method may further comprise moving the first and second molds away from each other after having heated the first and second connecting region, and displacing the first and second components relative to the first and second molds to a position in between the third and fourth molds. Hence, in this embodiment, the first and second molds and the third and fourth molds constitute two separate presses that are spaced apart from each other. A relative position of the first and second components may be fixated during the application of pressure by the first and second molds, and when used, during said displacing of the first and second components, and during the application of pressure by the third and fourth molds. Additionally or alternatively, the method may comprise clamping the first and second components together at least in a region at or close to the first and second connecting regions during said displacing. The clamping may be performed using a clamping unit, wherein the first and second molds and the third and fourth molds are configured to apply heat and pressure to the first and second components via said clamping unit, which is, at least during the application of said heat and pressure, arranged in between first and second mold or in between the third and fourth mold, respectively. This clamping unit may comprise a first clamping member and a second clamping member. Furthermore, the first clamping member and/or the second clamping member may be provided with an alignment structure for aligning the first and/or second component relative to the first and/or second clamping member.

The first and second clamping member may each have a shape that is complementary to a shape of a respective side of the first and second components, the first and second clamping members preferably having a uniform thickness at least in region at or near the first and second connecting region. In this embodiment, the clamping members may follow the shape of the first and second components thereby allowing the clamping members to have a substantially constant thickness. When using clamping members having a substantially constant thickness, a constant temperature profile can be observed by the first and second components in the first and second connecting region. A disadvantage of this approach is that the first, second, third, and fourth molds need to be adapted to the shape of the first and second component as the clamping member merely mimics this shape.

The third and fourth mold may, when brought together, completely enclose the first and second connecting regions. Moreover, a part of the first component remote from the first connecting region may extend outside of the third and fourth molds, and a part of the second component remote from the second connecting region may extend outside of the third and fourth molds.

Additionally or alternatively, the first and second mold may, when brought together, completely enclose the first and second connecting regions. A part of the first component remote from the first connecting region may extend outside of the first and second mold, and a part of the second component remote from the second connecting region may extend outside of the first and second mold. Hence, in this manner local heating can be used to only melt the thermoplastic material at or near the connecting regions. To this end, a temperature of the first mold and a temperature of the second mold may be controlled such that a local temperature of the mold close to or at the first and second connecting regions is higher than the melting temperature of the thermoplastic composite plies of the first and second components, and such that a local temperature of the first and/or second mold close to an end of that mold from which the remaining part of the first or second component extends is lower than said melting temperature.

The first and second connecting regions may comprise a first and second ply drop off, respectively, wherein the first and second ply drop offs have a complementary shape. The first and second ply drop off may have been constructed using the method described before in which the ply drop offs were constructed before consolidation.

Hereinafter, various features will be described that equally apply to the method according to the first aspect of the invention as to the method according to the second aspect. These features equally apply to a thermoplastic composite product according to a third aspect of the invention which will be discussed later.

The first and second components can be made from the same stack of plies. Additionally or alternatively, each ply in the stack of plies for the first and/or second components may be a unidirectional thermoplastic composite ply. In these plies, the fibers are oriented in a single direction. This direction will be referred to as the orientation of the ply. Respective plies may be stacked in the stack for the first and/or second component such that an orientation thereof varies in the stacking direction. For example, the orientation of adjacent plies may be rotated relative to each other, for example by 45 or 90 degrees.

The thermoplastic composite plies may each comprise one or more thermoplastic materials from the group consisting of polyolefin, polyamide, polyetherimide, polyphenylene sulfide, polyether ether ketone, polyetherketoneketone, and polyaryletherketone. Additionally or alternatively, the thermoplastic composite plies may each comprise fibers made from one or more material from the group consisting of glass fibers, aramid fibers, basalt fibers, silicon carbide fibers, and carbon fibers.

The thermoplastic composite plies used for making the first and second components are preferably identical, and/or the ply stacks used for making the first and second components have an identical arrangement of orientation.

The method may further comprise shaping the first and second components prior to connecting them using the simultaneous application of heat and pressure for imparting a shape or profile to the first and/or second component. For example, the first and second components may be given a curved shape.

The method may also comprise performing a mechanical processing onto a surface of the first and second connecting regions for the purpose of removing a top layer prior to connecting the first and second components. Such processing may be performed after the abovementioned shaping. For example, a mechanical polishing action may be performed to increase the adhesion between the first and second connection regions or to remove solvent remains or excess thermoplastic material. Such polishing action is performed before locally melting the first and second connection regions as described above.

The method may further comprise applying thermoplastic material to the first and/or second connecting regions prior to connecting the first and second components, said thermoplastic material preferably being the same as the thermoplastic material of the first and/or second component or being a thermoplastic material belonging to the same family of materials as the thermoplastic material used in the first and/or second component albeit having a lower melting temperature. This may equally improve the adhesion between the first and second connecting regions.

The first and second mold, and the third and fourth mold when used, may have a shape that is complementary to a shape of the first and second components at least in a region of the mold that is configured to engage the first and/or second connecting region.

According to a third aspect, the present invention provides a thermoplastic composite product made from a first and second thermoplastic composite component, each component made from a consolidated stack of thermoplastic composite plies, and having a first and second ply drop off, respectively, which first and second ply drop offs have a complementary shape and which are aligned, and wherein the first and second components are fixedly connected to each other by melting the thermoplastic material of the plies at least locally near the first and second ply drop offs. According to the third aspect, the thermoplastic composite product is characterized in that the first and second ply drop offs were formed in the stack of plies before consolidation thereof.

The first and second components can be each curved and/or profiled. Additionally or alternatively, the thermoplastic composite product can be manufactured using the method according to the first and/or second aspect of the present invention. Therefore, features mentioned in connection with those methods equally apply to the thermoplastic composite product according to the third aspect of the invention and vice versa.

According to a fourth aspect, the present invention provides a structural component of an aircraft comprising the thermoplastic composite product described above.

According to a fifth aspect, the present invention provides a thermoplastic composite component configured to be used in the method as described above. This component is made from a consolidated stack of thermoplastic composite plies and has a ply drop off. The component is characterized in that the ply drop off was formed in the stack of plies before consolidation thereof.

In this component, each ply in the stack of plies for the thermoplastic composite component may be a unidirectional thermoplastic composite ply. The respective plies can be stacked in the stack for the thermoplastic composite component such that an orientation thereof varies in the stacking direction. The thermoplastic composite plies may each comprise one or more thermoplastic materials from the group consisting of polyolefin, polyamide, polyetherimide, polyphenylene sulfide, polyether ether ketone, polyetherketoneketone, and polyaryletherketone, and/or the thermoplastic composite plies may each comprise fibers made from one or more material from the group consisting of glass fibers, aramid fibers, basalt fibers, silicon carbide fibers, and carbon fibers.

BRIEF DESCRIPTION OF THE DRAWING

Next, the invention will be described in more detail referring to the appended drawings, wherein.

DETAILED DESCRIPTION

Figure 1:
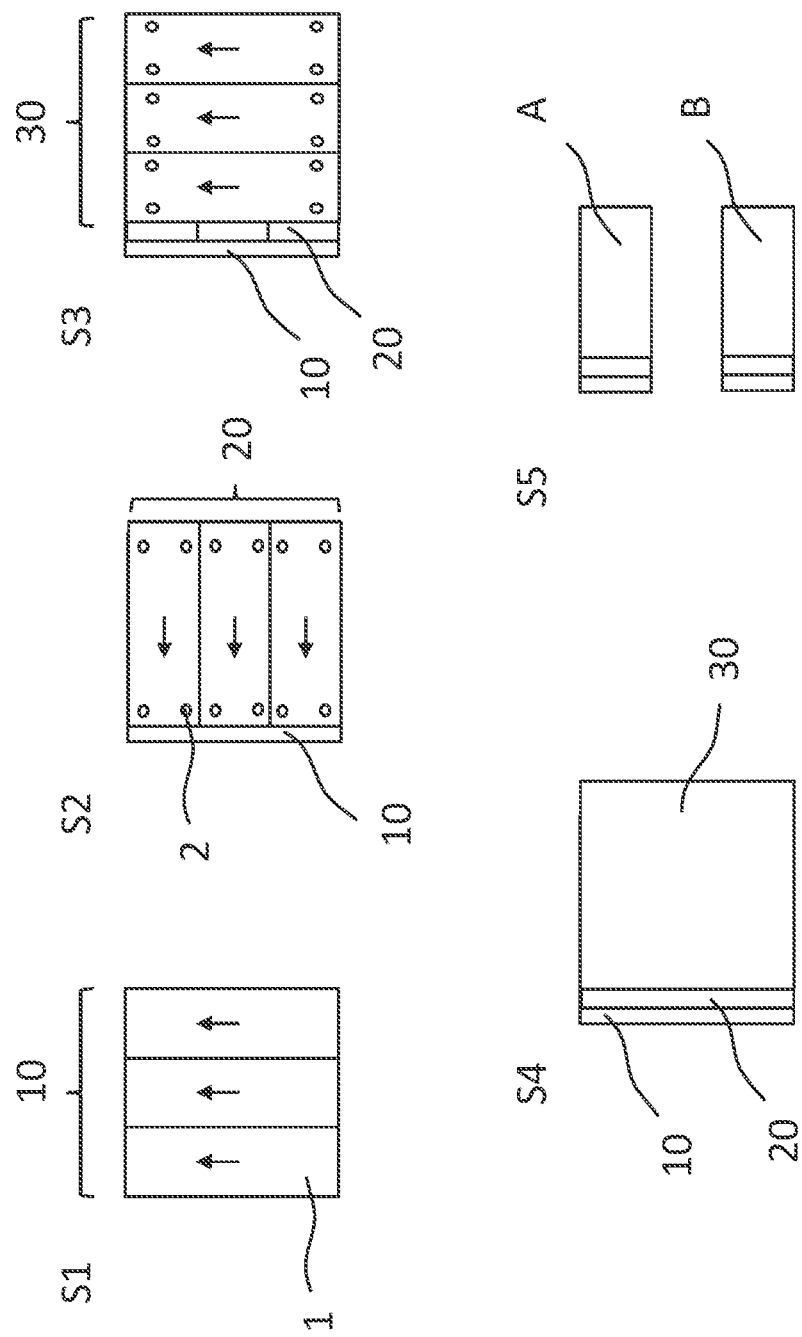
FIG. 1 illustrates a method for manufacturing a first and second thermoplastic composite component having a ply drop off in accordance with the invention.

FIG. 1 illustrates a method for manufacturing a first and second thermoplastic composite component having a ply drop off in accordance with the invention. As a first step S1, a plurality of unidirectional thermoplastic composite plies 1 is arranged with the orientation of the plies, indicated by the arrows in the figure, being identical. In FIG. 1, plies 1 are identical and comprise aligned reinforcing fibers that are encapsulated by a thermoplastic material. Together, plies 1 form a first layer 10. Plies 1 can be arranged on a table using a suitable robotic arm or may be arranged manually. In addition, plies 1 may be mutually fixated, e.g. using tack welding such as ultrasonic welding.

As a second step S2, another layer of plies 1 is arranged on top of plies 1 that were already placed albeit using a different orientation, e.g. 90 degrees difference. Together, plies 1 form a second layer 20. This process is repeated in a third step S3 for the formation of a third layer 30.

When arranging plies 1 for the formation of second layer 20, an offset is provided in a lateral direction, the direction from left to right in FIG. 1, such that a small ribbon of layer 10 is visible. A similar offset is provided when arranging layer 30 on top of layer 20. In this manner, a stepped structure is achieved near opposing edges of the layer stack comprising layers 10, 20, 30.

To ensure that the positioning of plies 1 remains fixed, plies 1 of layer 20 may be fixated to layer 10 by means of local application of heat such as ultrasonic welding and/or tack welding. This is indicated by circles 20. Similar fixation may be used for positioning layer 30 relative to layer 20.

In step S4, the entire layer stack thus formed is subjected to a consolidation process. In this process, the simultaneous application of pressure and heat causes the thermoplastic material of plies 1 to melt. Upon cooling down, the fibers inside plies 1 will be held in an integral block of thermoplastic material. As such, a distinction between plies 1 in the same layer cannot or hardly be made. A distinction between plies 1 in the stacking direction, i.e. perpendicular to layers 10, 20, 30, could however in some cases still be made due to density differences of the fibers in plies 1 and/or due to differences in orientation of the fibers in plies 1.

After having been consolidated, the layer stack can be cut or otherwise processed for the purpose of obtaining various components in step S5. In FIG. 1, by way of example only, a first component A and a second component B is obtained by cutting the layer stack in a direction perpendicular to the stepped structure of the ply drop off. In addition, one of the ends of the layer stack is cut in a direction parallel to the stepped structure. Consequently, the stepped structure is only present on one side of components A and B.

Figure 2:
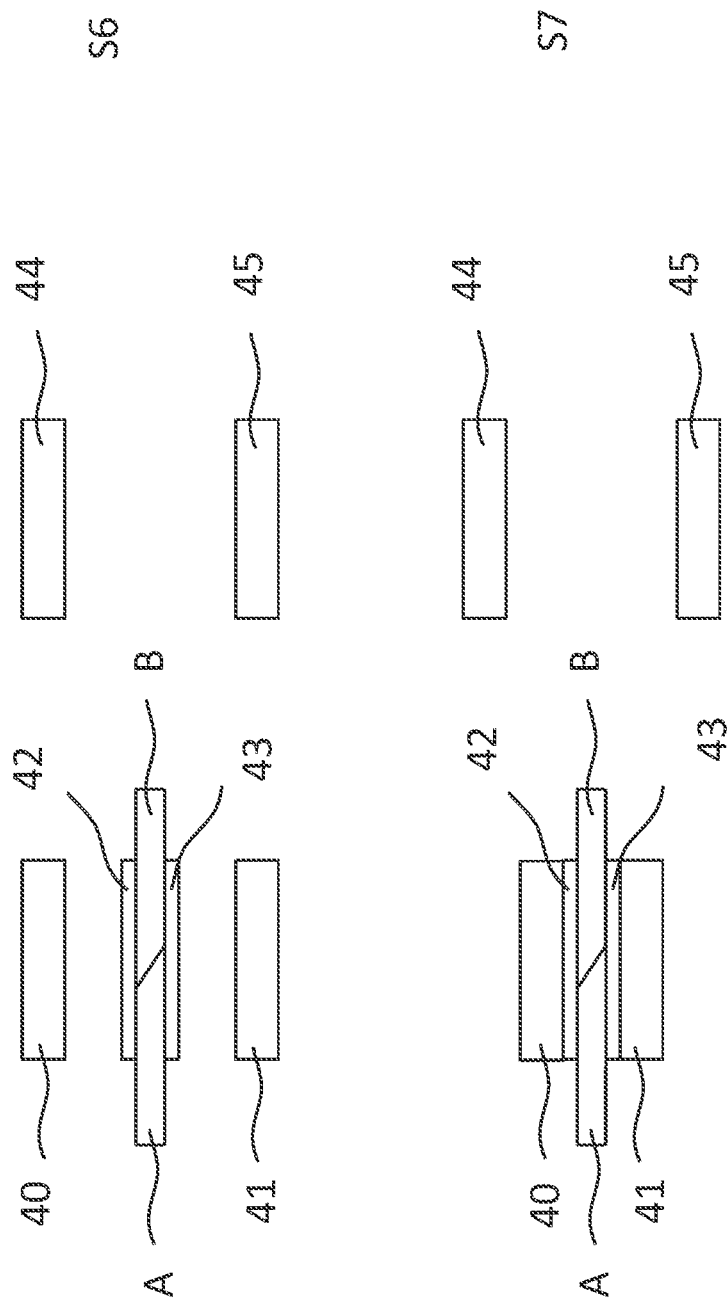
FIGS. 2-5 illustrate the steps of a method for manufacturing a thermoplastics composite product in accordance with the invention.

Next, in step S6 shown in FIG. 2, components A and B are aligned relative to each other such that the ply drop offs face each other. To facilitate the mutual positioning of components A and B, a first clamping member 42 and a second clamping member 42 are used in between which components A and B are clamped. It is further noted that the stepped ply drop off is represented in FIG. 2 by an inclined line.

The entire combination of components A and B and clamping members 42, 43 is brought in between a first mold 40 and a second mold 41. These molds are heated to a temperature above the melting temperature of the thermoplastic material inside components A and B. Therefore, when molds 40, 41 are brought together, as shown in connection with step S7, components A and B will locally melt by the molds and via clamping members 42, 43. More in particular, the regions of components A and B having the ply drop offs will melt whereas remaining parts of components A and B located outside molds 40, 41 will maintain their solid state. During the application of heat, molds 40, 41 will apply pressure onto components A and B.

Figure 3:
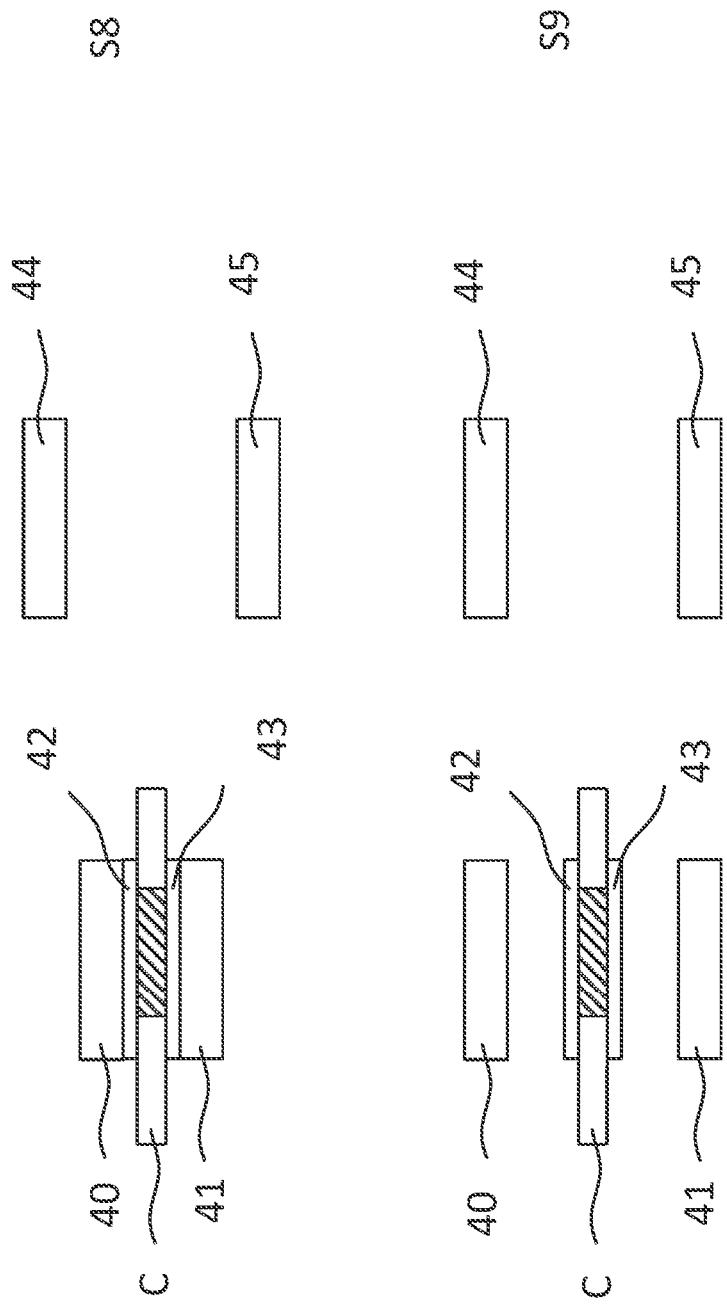

As illustrated in FIG. 3, step S8, after components A and B have locally melted, a distinction between these components can no longer be made, or at least very difficult. Therefore, the combination of components A and B will hereinafter be referred to as product C. In FIG. 3, the dashed structure refers to the regions containing the ply drop offs that have been heated to a temperature above the melting temperature of the thermoplastic material inside components A and B. As will be explained later in conjunction with FIGS. 6 and 8, the temperature of molds 40, 41 near the edges thereof may not reach the melting temperature.

Figure 4:
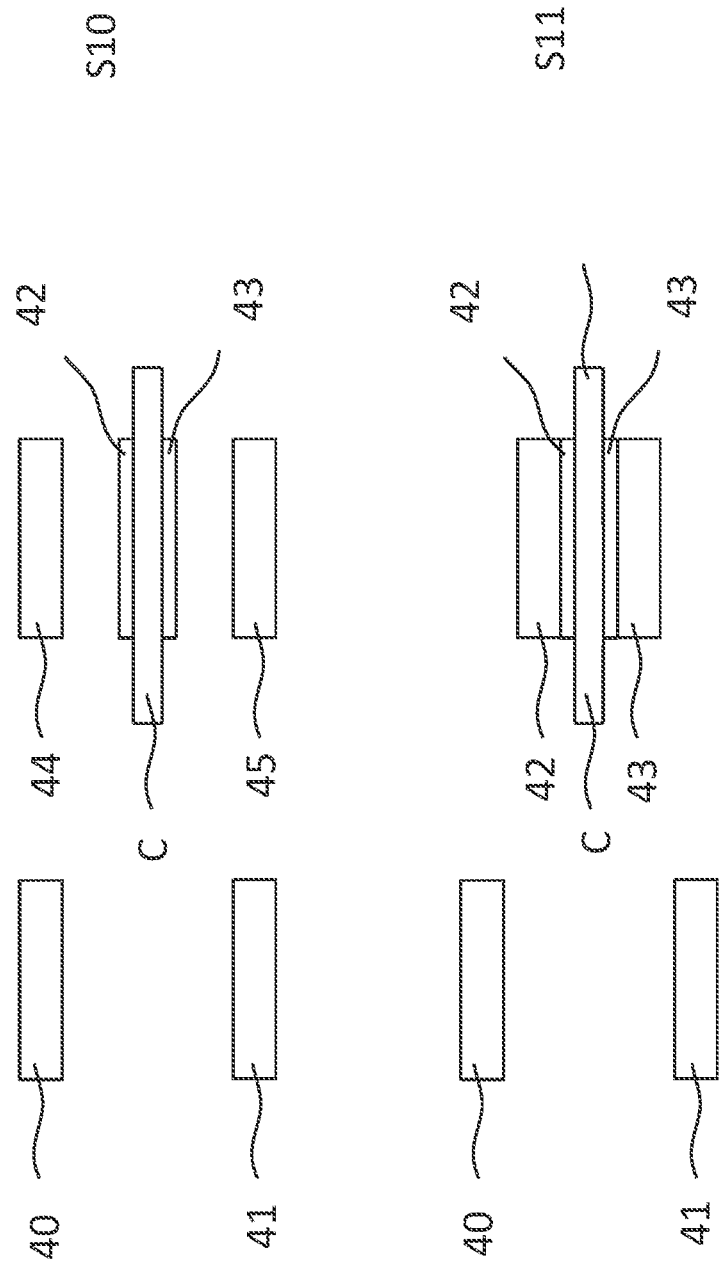

In step S9, molds 40 and 41 are moved away from product C. It should be noted that product C is still clamped between clamping members 42, 43. The entire combination of clamping members 42, 43 and product C is brought, in step S10 in FIG. 4, to a second press comprising a third mold 44 and fourth mold 45. Molds 44, 45 are heated to a temperature below the melting temperature of the thermoplastic material inside product C.

In step S11, molds 44 and 45 are brought together and product C, which at this time may (as shown) or may not have a temperature in the connecting region below the melting temperature, is cooled down further. During the cooling down, molds 44, 45 will apply a pressure onto product C.

Figure 5:
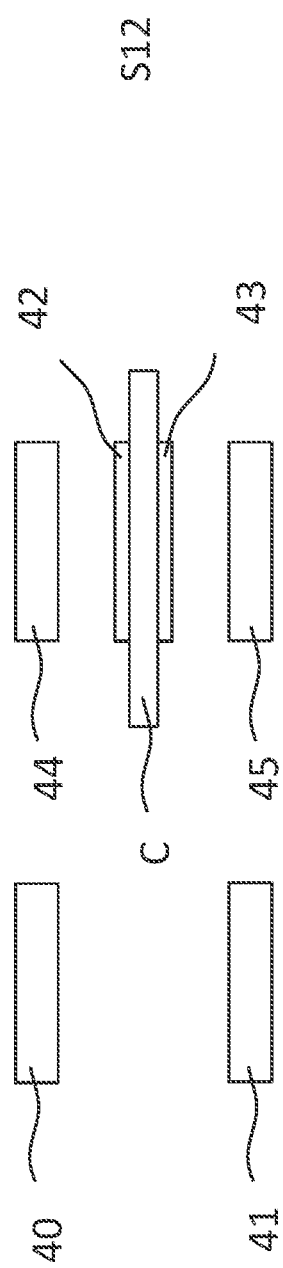

In step S12 shown in FIG. 5, molds 44 and 45 are moved away from product C and clamping members 42, 43. Thereafter, clamping members 42, 43 can be removed to obtain product C.

Figure 6:
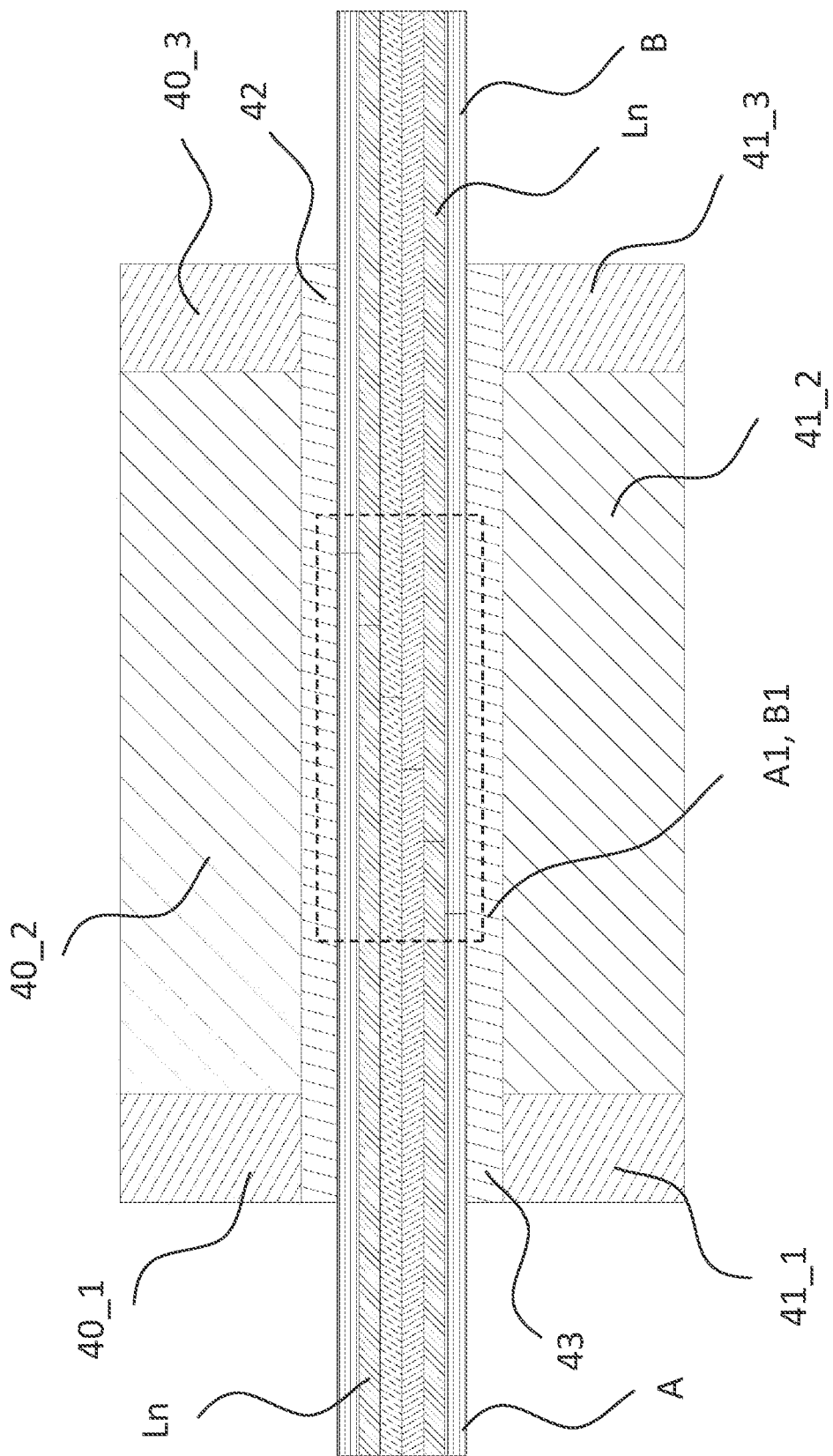
FIG. 6 illustrates an example of a first and second component arranged in between a first and second mold corresponding to step S7 of FIG. 2.

FIG. 6 provides a cross section corresponding to step S7 shown in FIG. 2. As shown, mold 40 comprises three parts 40_1, 40_2, 40_3, wherein the temperature of part 40_2 can be controlled relative to parts 40_1 and 40_3. More in particular, part 40_2 is brought to a temperature exceeding the melting temperature of the thermoplastic material inside plies 1, whereas parts 40_1, 40_3 are brought to a temperature below the melting temperature Similar considerations hold for parts 41_1, 41_2, 41_3 of the second mold. In this manner, local melting of components A and B only in the connecting region A1, B1 thereof can be obtained. To achieve the abovementioned difference in heating, parts 40_1, 40_3, 41_1, and 41_3 may be manufactured from a material that differs from the material used for parts 40_2, 41_2. Additionally or alternatively, heating means, such as heating coils, may be provided more or only in parts 40_2, 41_2. Additionally or alternatively, cooling means may be provided only in parts 40_1, 40_3, 41_1, and 41_3.

Figure 7:
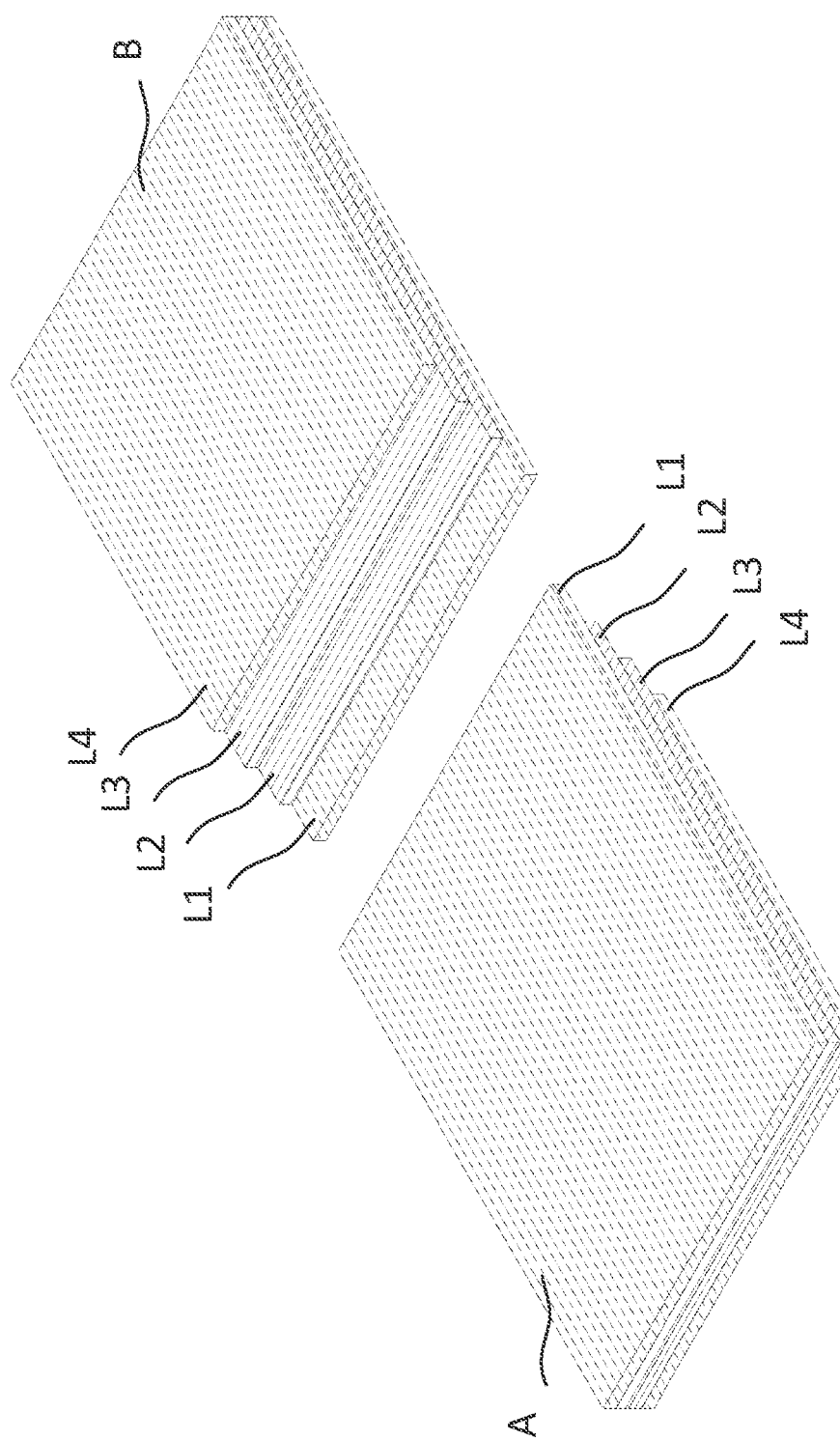
FIG. 7 illustrates a perspective view of a first and second component in accordance with the invention.
Figure 8:
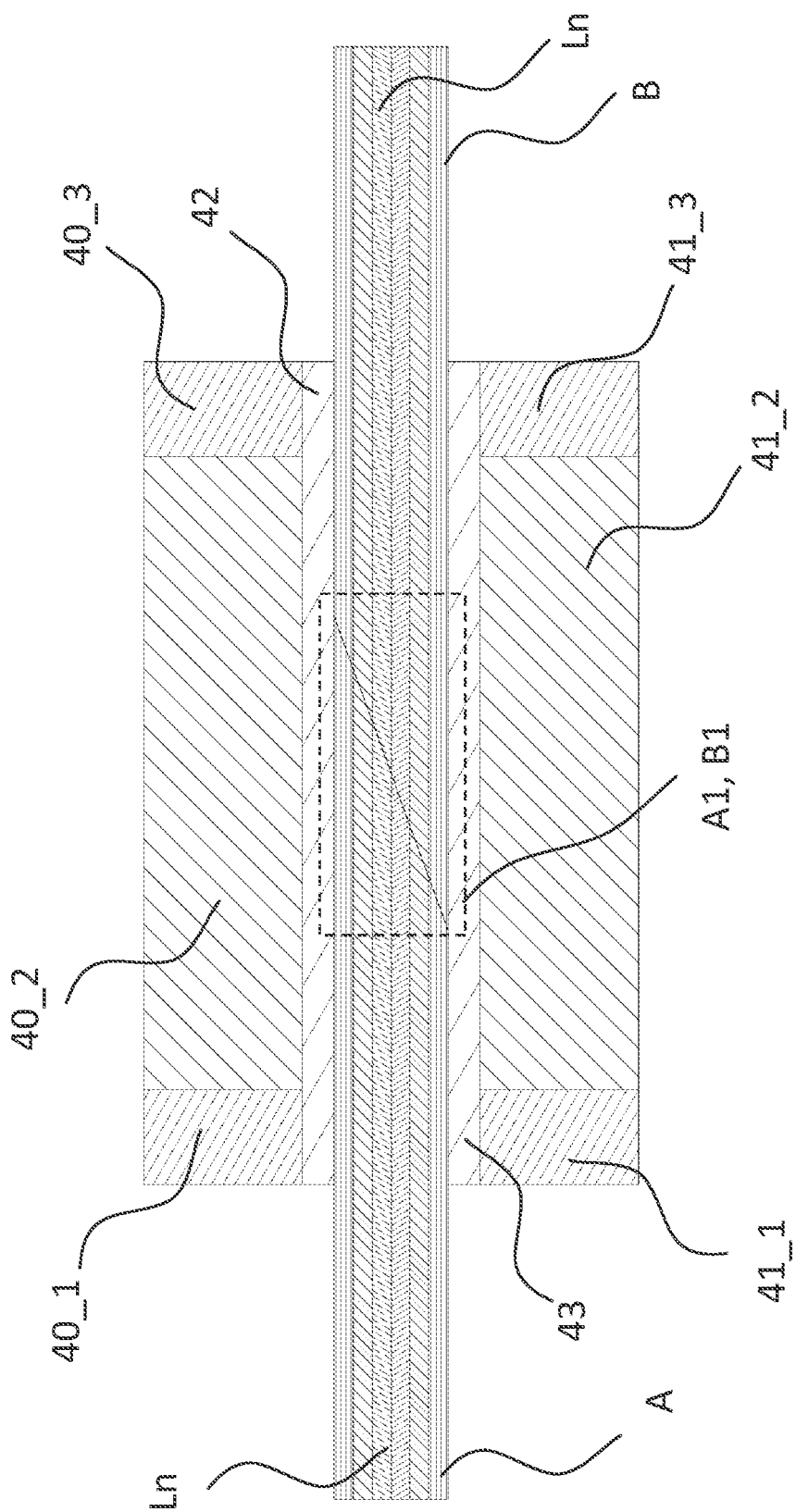
FIG. 8 illustrates a further example of a first and second component arranged in between a first and second mold corresponding to step S7 of FIG. 2.

In FIG. 6, components A and B are shown each having layers L1-L4. The ply drop off formed in components A and B comprises a stepped structure which is shown in more detail in FIG. 7. However, the present invention is not limited to stepped structures. For example, FIG. 8 illustrates components A and B having different ply drop offs. Compared to the ply drop off in FIG. 6, it can be observed that the edges of plies 1 are slanted to form an inclined and flat surface at the edges of components A and B. Such structure can be obtained by subjecting components A and B to a mechanical process, such as grinding, either prior to or after step S5 in FIG. 1.

In the above, the invention has been described using detailed embodiments thereof. However, the present invention is not limited to these examples and various modifications are possible without departing from the scope of the present invention, which is defined by the appended claims.

For example, in the description above, a thermoplastic composite product was formed by aligning the first ply drop off and the second ply drop off of the first and second components, respectively. Within the context of the present invention, such alignment may also include positioning the first ply drop off and the second ply drop off such that on one side, e.g. the top side, the first component extends m plies above the second component, whereas on an opposing side, e.g. the bottom side, the second component extends n plies above the first component. Preferably, the same layer stack is used for the first and second component. Moreover, each ply stack may comprise a plurality of plies having substantially the same thickness so that m=n.

For example, the first ply drop off may comprise layers 1, 2, 3, 4, and 5, wherein layers 2, 3, 4, and 5 are each offset by +5 mm relative to the previous layer. Moreover, the orientation of the fibers in these layers may be 0, 90, 0, 90, and 0 degrees. The second ply drop off may comprise layers 6, 7, 8, 9, and 10, wherein layers 7, 8, 9, and 10 are each offset by −5 mm relative to the previous layer. Moreover, the orientation of the fibers in these layers may be 0, 90, 0, 90, and 0 degrees.

In one possible connection, the first ply drop off may be aligned relative to the second ply drop off such that layers 1 and 6, layers 2 and 7, layers 3 and 8, layers 4 and 9, and layers 5 and 10 are aligned. Such alignment corresponds to a full alignment as shown in FIGS. 6 and 8.

Alternatively, the alignment may be partial. For example, the first ply drop off may be aligned relative to the second ply drop off such that layers 2 and 6, layers 3 and 7, layers 4 and 8, and layers 5 and 9 are aligned. This means that in this example, the second ply drop off is positioned one ply higher than the first ply drop off. In other words, layers 1 and 10 are not aligned with an opposing layer. Within the context of the present invention, the alignment should be such that alignment between layers is achieved for more than 75 percent of the ply stack of the first and second components.

As stated earlier, the stack of plies for each of the first and second component may comprise adjacently arranged ply groups, each ply group comprising at least one ply, wherein the plies in a same ply group are not offset relative to each other, and wherein each ply group is offset relative to an adjacent ply group. In case a ply group comprises multiple plies, each or some of the plies in the same ply group may have a different orientation of the fibers relative to the other ply or plies in that ply group. Alternatively, the orientation of the fibers in the plies of the same ply group could be identical.

The invention claimed is:

1. A method of manufacturing a thermoplastic composite product, comprising:
   providing a first thermoplastic composite component made from a consolidated stack of thermoplastic composite plies, said first thermoplastic composite component having a first ply drop off;
   providing a second thermoplastic composite component made from a consolidated stack of thermoplastic composite plies, said second thermoplastic composite component having a second ply drop off having a shape that is complementary to a shape of the first ply drop off;
   arranging the first and second thermoplastic composite components in between a first mold and a second mold with the first and second ply drop offs being aligned; and
   bringing the first and second molds towards each other for the purpose of heating the first and second ply drop offs while simultaneously applying pressure to the first and second ply drop offs, wherein said heating the first and second ply drop offs comprises controlling a temperature of the first mold and a temperature of the second mold such that a local temperature of the first and/or second mold at a region in which the first and second ply drop offs are aligned is higher than the melting temperature of the thermoplastic composite plies of the first and second thermoplastic composite components, and such that a local temperature of the first and/or second mold at an end of the first mold and/or the second mold is lower than said melting temperature.

2. The method of claim 1, wherein the first mold comprises a first part, a second part, and a third part arranged in between the first part and the second part of the first mold, wherein the second mold comprises a first part, a second part, and a third part arranged in between the first part and the second part of the second mold;
   wherein said heating the first and second ply drop offs comprises bringing the second parts of the first and second molds to a temperature exceeding said melting temperature, and bringing the first and third parts of the first and second molds to a temperature below said melting temperature.

3. The method of claim 2, wherein a material of which the second parts of the first and second molds are manufactured is different from a material of which the first and third parts of the first and second molds are manufactured.

4. The method of claim 2, wherein one or more heaters are provided only in the second parts of the first and second molds, or wherein more heaters are provided in the second parts of the first and second molds than are provided in the first or third parts of the first and second molds.

5. The method of claim 2, wherein a cooler is provided only in the first and third parts of the first and second molds.

6. The method of claim 1, wherein the stack of thermoplastic composite plies for each of the first and second thermoplastic composite component comprises adjacently arranged ply groups, each ply group comprising at least one thermoplastic composite ply, wherein the thermoplastic composite plies in a same ply group are not offset relative to each other, and wherein each ply group is offset relative to an adjacent ply group.

7. The method of claim 6, wherein at least one ply group among the ply groups of the first and second thermoplastic composite components comprises a plurality of thermoplastic composite plies; and/or
   wherein an offset between adjacent thermoplastic composite plies or between adjacent ply groups is identical throughout the stack of thermoplastic composite plies; and/or
   wherein the offset between adjacent thermoplastic composite plies or between adjacent ply groups exceeds 5 mm.

8. The method of claim 1, wherein said providing a first thermoplastic composite component comprises stacking thermoplastic composite plies in a stacking direction for the purpose of forming the first ply drop off, wherein the thermoplastic composite plies are arranged such that thermoplastic composite plies at a different position along the stacking direction are laterally offset relative to each other; and
   wherein said providing a second thermoplastic composite component comprises stacking thermoplastic composite plies in the stacking direction for the purpose of forming the second ply drop off, wherein the thermoplastic composite plies are arranged such that thermoplastic composite plies at a different position along the stacking direction are laterally offset relative to each other;
   consolidating the stack of thermoplastic composite plies for the first thermoplastic composite component and consolidating the stack of thermoplastic composite plies for the second component.

9. The method of claim 8, wherein said stacking of thermoplastic composite plies for the first thermoplastic composite component comprises locally fixating a thermoplastic composite ply to an already arranged thermoplastic composite ply by means of local application of heat; and/or
wherein said stacking of thermoplastic composite plies for the second thermoplastic composite component comprises locally fixating a thermoplastic composite ply to an already arranged thermoplastic composite ply by means of local application of heat.

10. The method of claim 1, comprising clamping or otherwise fixating the relative position of the first and second thermoplastic composite components at least during said heating of the first and second ply drop offs for the purpose of aligning the first ply drop off and the second ply drop off.

11. The method of claim 1, further comprising:
providing a third mold and a fourth mold;
arranging the first and second thermoplastic composite components in between the third and fourth molds with the first and second ply drop offs being aligned, after having been arranged in between the first and second molds; and
bringing the third and fourth molds towards each other for the purpose of cooling down the first and second ply drop offs while simultaneously applying pressure to the first and second ply drop offs;
wherein the third and fourth molds are heated to a temperature below the melting temperature(s) of the thermoplastic composite plies of the first and second thermoplastic composite components, and wherein the method further comprises moving the first and second molds away from each other after having heated the first and second ply drop off, and displacing the first and second thermoplastic composite components relative to the first and second molds to a position in between the third and fourth molds.

12. The method of claim 11, comprising clamping or otherwise fixating the relative position of the first and second thermoplastic composite components at least during said heating of the first and second ply drop offs for aligning the first ply drop off and the second ply drop off, and wherein the relative position of the first and second thermoplastic composite components remains fixed during said displacing of the first and second components and during the application of pressure by the third and fourth molds.

13. The method of claim 11, wherein the third and fourth mold, when brought together, completely enclose the first and second ply drop offs, and wherein a part of the first thermoplastic composite component remote from the first ply drop off extends outside of the third and fourth molds, and wherein a part of the second thermoplastic composite component remote from the second ply drop off extends outside of the third and fourth molds.

14. The method of claim 1, wherein the first and second molds, when brought together, completely enclose the first and second ply drop offs.

15. The method of claim 14, wherein a part of the first thermoplastic composite component remote from the first ply drop off extends outside of the first and second molds, and wherein a part of the second thermoplastic composite component remote from the second ply drop off extends outside of the first and second mold.

16. The method of claim 1, wherein the first and second thermoplastic composite components are made from a same stack of plies; and/or wherein each ply in a stack of plies for the first and/or second components is a unidirectional thermoplastic composite ply, and wherein the respective thermoplastic composite plies are stacked in the stack for the first and/or second thermoplastic composite component such that an orientation thereof varies in the stacking direction.

17. The method of claim 1, wherein the thermoplastic composite plies each comprise one or more thermoplastic materials selected from the group consisting of polyolefin, polyamide, polyetherimide, polyphenylene sulfide, polyether ether ketone, polyetherketoneketone, and polyaryletherketone, and/or wherein the thermoplastic composite plies each comprise fibers made from one or more material selected from the group consisting of glass fibers, aramid fibers, basalt fibers, silicon carbide fibers, and carbon fibers; and/or
wherein the thermoplastic composite plies used for making the first and second thermoplastic composite components are identical, and/or wherein the ply stacks used for making the first and second thermoplastic composite components have an identical arrangement of orientation.

18. The method of claim 1, further comprising shaping the first and second thermoplastic composite components prior to connecting them using the simultaneous application of heat and pressure for imparting a shape or profile to the first and/or second thermoplastic composite component; and/or
the method further comprising performing a mechanical processing onto a surface of the first and second connecting regions for the purpose of removing a top layer prior to connecting the first and second thermoplastic composite components.

19. The method of claim 1, further comprising applying thermoplastic material to connecting regions of the first thermoplastic composite component and/or the second thermoplastic composite component prior to connecting the first and second thermoplastic composite components at the connecting regions, said thermoplastic material being the same as the thermoplastic material of the first thermoplastic composite component and/or the second thermoplastic composite component or being a thermoplastic material being the same as the thermoplastic material used in the first and/or second thermoplastic composite component albeit having a lower melting temperature;
wherein the first and second mold, and, when used, a third mold and a fourth mold, have a shape that is complementary to a shape of the first and second thermoplastic composite components at least in a region of the mold that is configured to engage the connecting region of the first thermoplastic composite component and/or the second thermoplastic composite component.

* * * * *